June 12, 1956 H. STAMM 2,749,701

WINDING AND HAND-SETTING MECHANISM FOR TIMEPIECES

Filed May 6, 1952

Inventor
Heinrich Stamm
by Karl Michaelis Atty.

United States Patent Office 2,749,701

Patented June 12, 1956

2,749,701

WINDING AND HAND-SETTING MECHANISM FOR TIMEPIECES

Heinrich Stamm, Grenchen, Switzerland, assignor to ETA Limited, Blanks Factory, Grenchen, Switzerland, a Swiss joint-stock company Application May 6, 1952, Serial No. 286,244

Claims priority, application Switzerland May 10, 1951

3 Claims. (Cl. 58—71)

Figure 1:
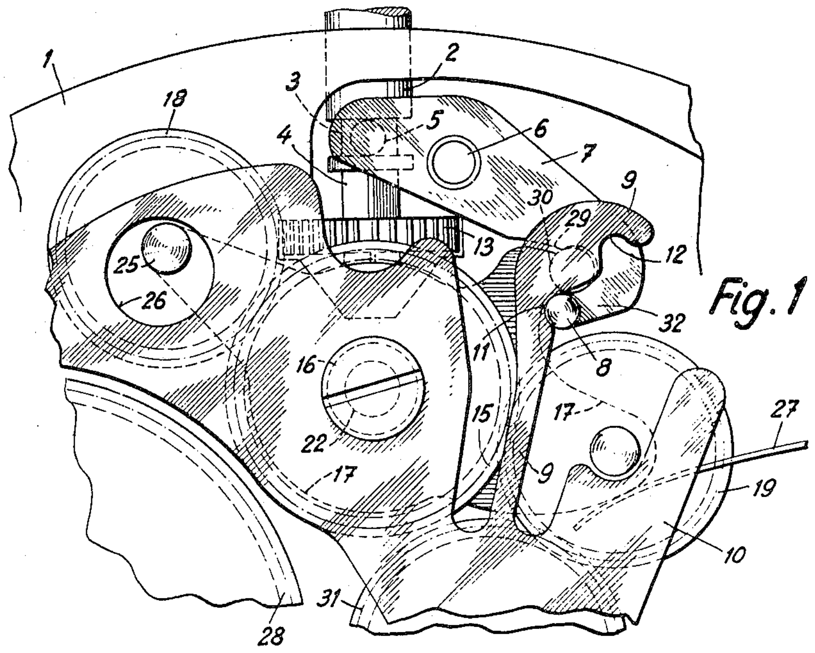

This invention relates to timepieces and more especially to the mechanism of winding up the clockwork and for setting the hands. It has particular reference to winding-up mechanisms comprising a rocking bar.

In mechanisms of this kind as hitherto in use, when the hand setting device is being thrown out, the center of the minute setting wheel moves in a circle around the center of the middle wheel, and since this latter wheel is held in its position by the transmission wheel, the teeth of the minute setting wheel, when the hand setting mechanism is thrown out, move on an epicycloid path. As regards the teeth of the minute setting wheel which contact the teeth of the minute wheel, the direction of movement differs considerably from the direction which is radial relative to the minute wheel.

It has in fact been found that when the hand setting mechanism is thrown out, the teeth of the two wheels mentioned above sometimes show a tendency of jamming, whereby the wheels may be prevented from being carried out of mesh.

It is an object of this invention to provide winding-up and hand-setting mechanism for timepieces comprising a rocking bar, in which this bar is carried by means of the setting lever into engagement with the hand setting mechanism so that the minute wheel is made to mesh with the minute setting wheel, the new mechanism being provided with a member carrying along the setting lever, which coacts with an extension of the rocking bar, in such a manner that this bar is positively guided by the said lever at least at the start of the disengagement step.

In the drawing affixed to this specification and forming part thereof an embodiment of the invention is illustrated diagrammatically by way of example.

In the drawing

Figure 2:
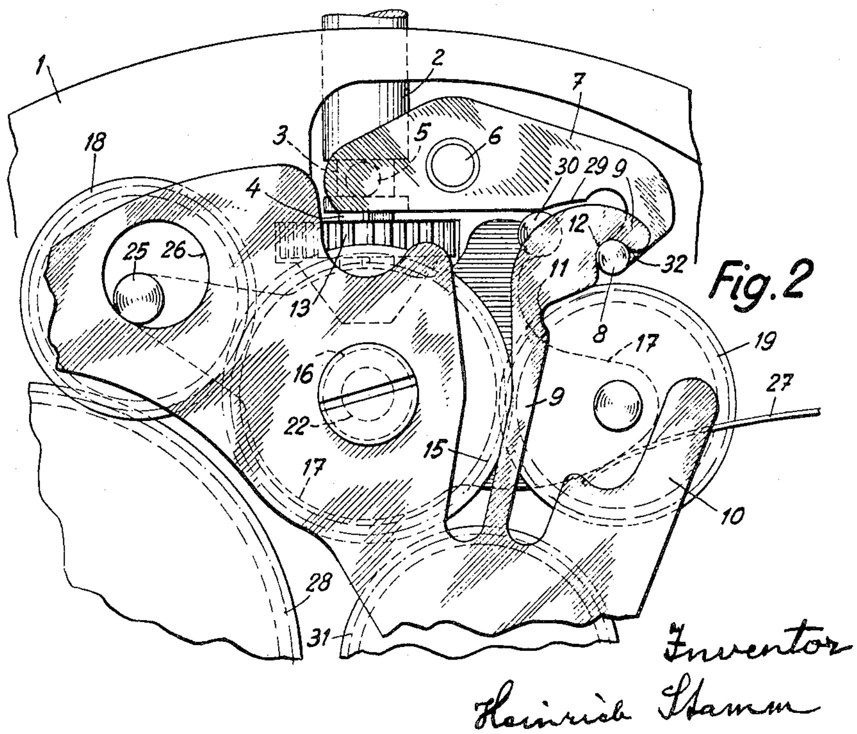

Fig. 1 illustrates the mechanism with its parts in the position in which the hands are set, while Fig. 2 shows the same parts ready for winding up the clockwork.

Referring to the drawing, 1 is a section of the plate on which the clockwork is mounted, and 2 is the stem mounted on the plate for rotation and for a short axial displacement in which it is coupled either with the hand-setting or with the winding-up devices. The stem is formed with a groove 3 and below the groove at 4 has a square section. 5 is a pin or bolt fixed to one arm of the double-armed setting lever 7 freely turning about an axle 6 fixed to the plate 1. The pin 5 extends into the groove 3. To the other end of the lever is fixed a nose 8 which can either enter a notch 11 or a notch 12 formed in the end of the elastic arm 9 of the setting lever spring 10 which covers the entire mechanism. In the winding-up position the nose 8 rests in the notch 12 (Fig. 2), in the hand-setting position in the notch 11. The prismatic section of the stem carries along the winding pinion 13 which is formed with a square perforation and in being rotated carries along the middle wheel 15 which can revolve about a sleeve 16 of the rocking bar 17 and drives the ratchet winding wheel 18 and the minute setting wheel 19. The sleeve 16 of the rocking bar is free to turn on a bolt 22 fixed to the plate 1. The check 25 on the rocking bar which extends into the aperture 26 of the setting lever spring serves for limiting the counter-clockwise tilting movement of the rocking bar.

In the winding-up position shown in Fig. 2 this bar is held by a spring 27 shown in a conventional manner. In this position the ratchet setting wheel 18 meshes with a barrel wheel 28 and the minute setting wheel turns together with the ratchet setting wheel without being engaged by the minute wheel 31.

By pulling out the stem the mechanism is transferred into hand-setting position, the axial displacement of the stem causing the groove 3 and pin 5 to rock the setting lever in clockwise direction, while a face 29 provided on the lever (Fig. 1) exerts pressure on a pin 30 fixed to the rocking bar 17, so that this bar is rocked clockwise against the action of the spring 27 until the minute setting wheel has come into mesh with the minute wheel (Fig. 1).

The mechanism can be returned into winding-up position by forcing the stem back and thereby rocking the setting lever in counter-clockwise direction. The hook-shaped extension 32 of the lever contacting the pin 30 of the rocking bar carries the bar along until the minute wheel and the minute setting wheel have been disengaged from each other (Fig. 1). The rocking bar is rocked further by the spring 27 until it reaches the winding-up position.

The device hereabove described offers the advantage that on the hand-setting mechanism having been thrown out, the teeth of the minute wheel and the minute setting wheel are pulled asunder and definitely disengaged from each other far enough that any jamming becomes impossible.

I wish it to be understood that I do not desire to be limited to the details shown in the drawing and described in the foregoing specification for obvious modifications will occur to a person skilled in the art.

I claim:

1. In a winding and hand-setting mechanism for timepieces the combination with a minute wheel, a minute setting wheel, a spring-actuated rocking bar and a lever for rocking said bar to assume the hand-setting position and operatively connecting said two wheels, of a member on said lever arranged to actuate said bar and to positively guide same during the beginning of the disengagement of said wheels.

2. The mechanism of claim 1, in which a hook-shaped extension forming the member of the lever is arranged for coaction with a cylindrical member forming part of the rocking bar.

3. The mechanism of claim 1, in which a hook-shaped extension forming the member of the lever is arranged for coaction with a cylindrical member forming part of the rocking bar and for releasing said cylindrical member as soon as the two wheels have been disengaged from each other.

References Cited in the file of this patent

UNITED STATES PATENTS

| | | |
|---|---|---|
| 228,987 | Davis | June 22, 1880 |
| 419,654 | Frese | Jan. 21, 1890 |
| 756,459 | Blanc | Apr. 5, 1904 |
| 856,183 | Sandoz | June 4, 1907 |

FOREIGN PATENTS

| | | |
|---|---|---|
| 273,137 | Switzerland | Apr. 16, 1951 |